United States Patent [19]

Hanson

[11] Patent Number: 5,249,429
[45] Date of Patent: Oct. 5, 1993

[54] METHODS OF OPERATING A REFRIGERATION SYSTEM

[75] Inventor: Jay L. Hanson, Bloomington, Minn.

[73] Assignee: Thermo King Corporation, Minneapolis, Minn.

[21] Appl. No.: 15,964

[22] Filed: Feb. 8, 1993

[51] Int. Cl.$^5$ .............................................. F25B 27/00
[52] U.S. Cl. ................................... 62/86; 62/126; 62/133; 62/179; 62/236; 62/323.4
[58] Field of Search ................... 62/86, 133, 236, 126, 62/323.4, 179

[56] References Cited

U.S. PATENT DOCUMENTS

| | | | |
|---|---|---|---|
| 3,720,842 | 3/1973 | Martin et al. | 62/236 X |
| 3,941,012 | 3/1976 | Mayer | 62/236 X |
| 4,616,743 | 10/1986 | Havemann | 192/105 BA |
| 4,811,569 | 3/1989 | Welch et al. | 62/239 |
| 4,846,327 | 7/1989 | Mayer | 192/84 C |
| 4,977,752 | 12/1990 | Hanson | 62/236 X |
| 5,105,096 | 4/1992 | Waldschmidt et al. | 62/236 |
| 5,140,826 | 8/1992 | Hanson et al. | 62/126 X |

FOREIGN PATENT DOCUMENTS

0107931 7/1982 Japan ................................ 62/236

*Primary Examiner*—William E. Wayner
*Attorney, Agent, or Firm*—M. J. Moran

[57] ABSTRACT

Methods of monitoring the operation of a refrigeration system, including interlocking the selection and operation of an engine and electric motor which are arranged to alternatively function as prime movers for a refrigerant compressor; detecting slippage of a clutch connected between the engine and compressor; and, detecting improper rotational direction of an evaporator fan motor. The interlocking method prevents energization of the drive motor while the engine is operative, and it includes monitoring engine oil pressure and engine RPM. The clutch slippage method includes detecting engine speed fluctuations and the polarity of battery current. The monitoring of the evaporator fan motor, which drives a fan which draws return air RA from a conditioned space, and discharges conditioned air DA into the conditioned space, includes the steps of comparing the difference between the temperatures RA and DA of the return air and discharge air with a predetermined reference value.

32 Claims, 4 Drawing Sheets

METHODS OF OPERATING A REFRIGERATION SYSTEM

TECHNICAL FIELD

The invention relates in general to methods of operating a refrigeration system: (1) to interlock the operation of first and second selectable compressor prime movers which respectively include an engine and a clutch, and an electric motor; (2) to detect slippage of the clutch during operation of the engine; and, (3) to detect improper rotational direction of an evaporator fan motor.

BACKGROUND ART

It is common in the field of transport refrigeration to selectively operate a refrigerant compressor via one of two prime movers. A first prime mover includes an internal combustion engine, such as a diesel engine, and a centrifugal or electric clutch; and, a second prime mover includes an electric drive motor. The engine and clutch drive the compressor while the associated truck, trailer, container, and the like, is away from a terminal, and the electric motor drives the compressor while the refrigeration system is accessible to a source of electrical potential, such as at a terminal or on board a ship. U.S. Pat. Nos. 3,720,842; 3,941,012; 4,616,743; 4,811,569; 4,846,327; and 5,105,096, all of which are assigned to the same assignee as the present application, illustrate arrangements for selectively and alternatively utilizing an internal combustion engine or an electric motor to drive a refrigerant compressor.

It would be desirable, and it is a first object of the invention, to be able to interlock the selection and operation of the engine and drive motor, to prevent energization of the electric motor while the engine is operative, and to de-energize the electric motor when running if starting of the engine is attempted.

It would also be desirable, and it is another object of the invention, to be able to detect slippage of the clutch disposed between the internal combustion engine and the refrigerant compressor.

It would also be desirable, and it is still another object of the invention, to be able to detect improper rotational direction of an evaporator fan motor, to provide backup protection in the event an electrical phase detector is faulty, improperly connected, or not used.

SUMMARY OF THE INVENTION

Briefly, the invention includes a method of interlocking the selection and operation of an internal combustion engine and an electric drive motor which are arranged to selectively and alternatively function as a prime mover for a refrigerant compressor in a refrigeration system, to prevent energization of the electric motor while the engine is operative. The method includes the steps of monitoring engine oil pressure, detecting the selection of the drive motor as the prime mover, determining if the engine oil pressure is zero in response to the detecting step finding selection of the drive motor as the prime mover, preventing energization of the drive motor, when de-energized, and de-energizing the drive motor, when energized, in response to the determining step finding the engine oil pressure is not zero, initiating a predetermined timing period in response to the determining step finding the engine oil pressure is not zero, repeating the step of determining if the engine oil pressure is zero at the expiration of the predetermined timing period, and providing an indication of a fault when the repeated determining step finds the engine oil pressure is not zero.

When the engine oil pressure is found to be zero, the method further includes the steps of determining if the speed of the internal combustion engine is zero, preventing energization of the drive motor, when de-energized, and de-energizing the drive motor, when energized, in response to the determining step finding that the engine speed is not zero, initiating a predetermined timing period in response to the determining step finding that the engine speed is not zero, repeating the step of determining if the engine speed is zero at the expiration of the predetermined period of time, and providing an indication of a fault when the repeated determining step finds the engine speed is not zero.

In another monitoring method of the invention, the monitored refrigeration system includes a clutch disposed between the engine and compressor, an alternator driven by rotation of the compressor, and a battery connected to be charged by the alternator, with the invention including a method of monitoring the clutch for slippage. This method includes detecting a predetermined fluctuation in the speed of the internal combustion engine, when the internal combustion engine is the selected prime mover, monitoring the polarity of the battery current, with a first polarity indicating battery charging current, and a second polarity indicating battery discharging current, and shutting the internal combustion engine down in response to: (1) the detecting step detecting said predetermined fluctuation in engine speed, and (2) the monitoring step detecting the second polarity. When a predetermined fluctuation in engine speed is detected and the first polarity of battery charging current is detected, predetermined engine speed fluctuations are counted, and if a predetermined number of engine speed fluctuations occur within a predetermined period of time, the internal combustion engine is shut down.

In still another monitoring method of the invention, the refrigeration system includes evaporator air mover means driven by an electric fan motor which draws return air from a conditioned space and discharges conditioned air into the conditioned space. The method detects reversed rotational direction of the evaporator fan motor, and it includes detecting the temperatures RA and DA of the return air and the discharge air, respectively, determining the difference between the temperatures RA and DA, to provide a first difference value $\Delta D$, comparing the first difference value $\Delta D$ with a first reference value, initiating a predetermined timing period in response to the first difference value $\Delta D$ exceeding the first reference value, periodically repeating the steps of detecting the temperatures RA and DA of the return air and the discharge air, and the step of determining the difference between the temperatures RA and DA to provide updated difference values $\Delta D$, comparing each updated difference value $\Delta D$ with a second reference value, which may be the same as the first reference value, and shutting the prime mover and fan motor down when the repeated steps find that each updated difference value $\Delta D$ consistently exceeds the second reference value over the predetermined period of time.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
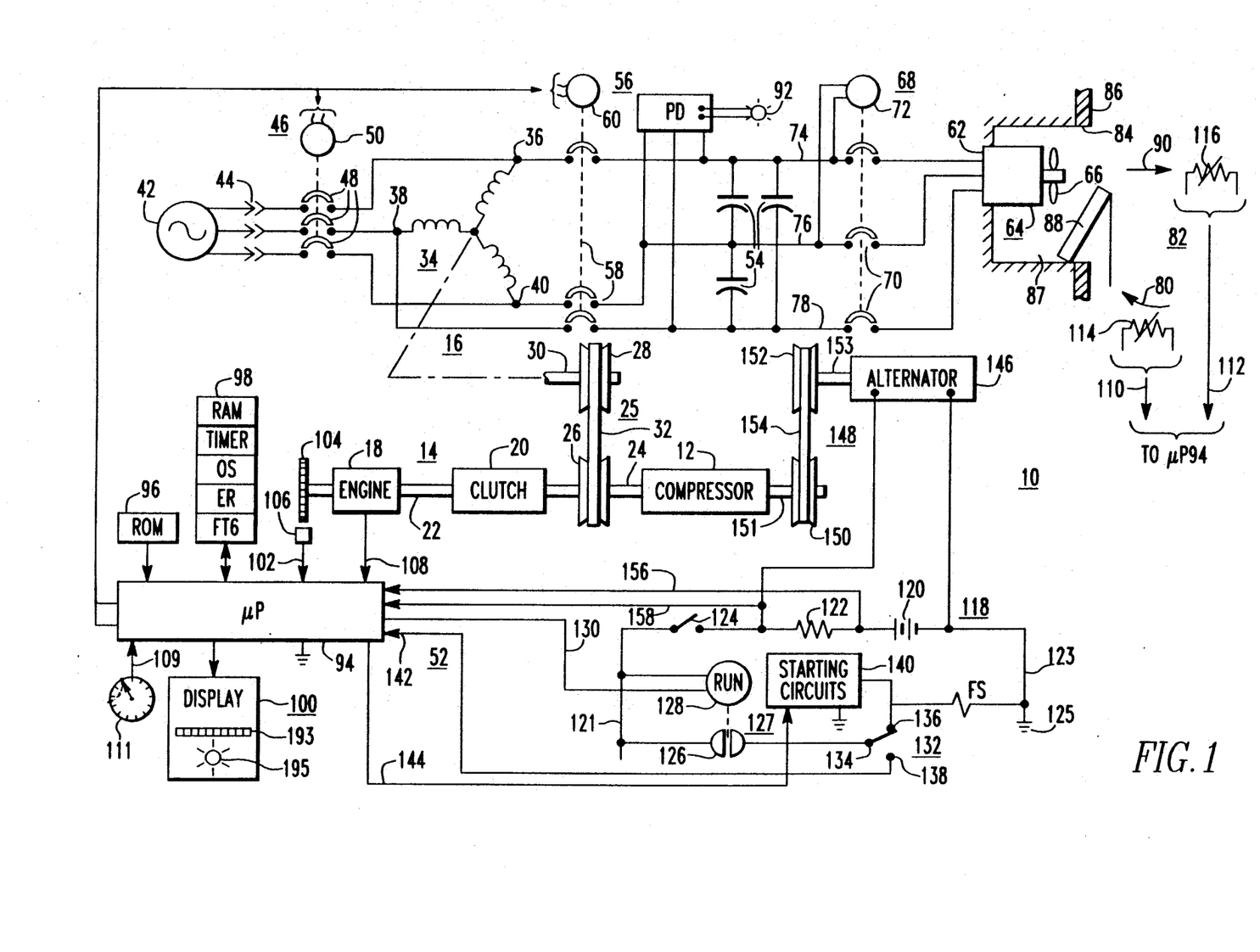
FIG. 1 is a schematic diagram of a refrigeration system which is monitored according to the teachings of the invention.

Referring now to the drawings, and to FIG. 1 in particular, there is shown a refrigeration system 10 which is monitored according to the teachings of the invention. Refrigeration system 10, which is preferably a transport refrigeration unit associated with a straight truck, a trailer, a container, and the like, includes a refrigerant compressor 12 arranged to be driven by a selected one of first and second prime movers 14 and 16, respectively. The specific arrangement utilized for interconnecting the engine, clutch, motor and compressor is not part of the invention, with an arrangement shown in the hereinbefore mentioned U.S. Pat. No. 5,105,096 being illustrated in FIG. 1 for purposes of example.

More specifically, the first prime mover 14 includes an internal combustion engine 18, gasoline or diesel, and a clutch 20, centrifugal or electric. Clutch 20 is coupled between an output shaft 22 of engine 18 and an input shaft 24 of compressor 12. When engine 18 is shut down, engine 18 is automatically disconnected from shaft 24 via clutch 20. The second prime mover 16 may then be energized to drive compressor 12, such as via a belt and pulley arrangement 25 which includes a pulley 26 fixed to compressor input shaft 24, a pulley 28 fixed to a shaft 30 of the second prime mover 16, and a belt 32 which links pulleys 26 and 28.

The second prime mover 16 is illustrated as including an induction drive motor 34 which is capable of being operated as an induction alternator. Thus, shaft 30 of prime mover 16 functions as an output shaft when motor 34 is operating as a motor, and as an input shaft driven by engine 18, when operating as an induction alternator. Induction motor 34 includes terminals 36, 38 and 40 which may be connected to a three-phase AC voltage source 42 via a plug-in connector 44, when refrigeration system 10 is stationary and close to source 42. An electrical contactor 46 having contacts 48 and an electromagnetic coil 50, is controlled by refrigerant electrical control 52, to selectively energize and de-energize motor 34 from voltage source 42. Thus, when engine 18 is shut down, and voltage source 42 is available, refrigeration control 52 may energize contactor 46 to drive compressor 12 with drive motor 34.

When engine 18 is operating as the prime mover for compressor 12, engine 18 drives both compressor 12 and motor 34. Excitation capacitors 54 are arranged to be connected across motor terminals 36, 38 and 40 via a contactor 56 having contacts 58 and an electromagnetic coil 60. Electromagnetic coil 60 of contactor 56 is energized when electrical control 52 desires to operate an evaporator fan motor 62 which is connected to air mover means 64, which may include a fan 66, as illustrated, or a blower, as desired. When the output voltage from motor 34 builds up to the pull-in voltage of a contactor 68 having contacts 70 and an electromagnetic coil 72 connected across any two of three output conductors 74, 76 and 78, contacts 70 will close to energize fan motor 62. When motor 34 is connected to voltage source 42, fan motor 62 is connectable to source 42 via contactors 46 and 56.

Air mover means 64, when rotating in the proper direction, draws return air, indicated by arrow 80, from a conditioned space 82, through an opening 84 in an enclosure 86 which surrounds conditioned space 82. Return air 80 is drawn into a fan plenum 87 through an evaporator 88, which is connected in a refrigerant flow path which includes compressor 12. Evaporator 88 conditions the return air 80, and the conditioned air is discharged from the fan plenum 87 back into conditioned space 82, as indicated by arrow 90. A phase detector PD may be connected to the three conductors 74, 76 and 78 which energize fan motor 62. When the source of potential 42 for fan motor 62 is not connected to conductors 74, 76 and 78 to cause the correct rotational direction for air mover means 64, phase detector PD energizes an alarm 92.

Electrical control 52 for operating refrigeration system 10 includes a controller or microprocessor 94 having a read-only-memory (ROM) 96 for storing application programs, a random-access-memory (RAM) 98 for storing program variables, and a display 100. Inputs to microprocessor 94 include a signal 102 responsive to the speed or revolutions-per-minute (RPM) of engine 18, such as provided by a toothed wheel 104 and a sensor 106; a signal 108 responsive to the oil pressure of engine 18; a signal 109 from a set point temperature selector 111, which selects the desired temperature of conditioned space 82; and signals 110 and 112 from the return air and discharge air temperature sensors 114 and 116, respectively. Microprocessor 94 develops a control error which includes the step of calculating the temperature difference $\Delta T$ between the temperature RA return air 80 and the set point temperature SP selected on set point temperature selector 111. The resulting control error is utilized with a control algorithm to determine the proper current operating condition of refrigeration unit 10, eg., a cooling cycle, a heating cycle, or a null cycle may be selected. A null cycle, when utilized, is entered when conditioned space 82 does not require a heating cycle or a cooling cycle to hold the temperature of conditioned space 82 in a predetermined "null" temperature band adjacent to the selected set point temperature. U.S. Pat. No. 5,123,252, which is assigned to the same assignee as the present application illustrates control algorithms which may be used.

Electrical control 52 includes an electrical circuit 118 which includes a battery 120 connected between a pair of power supply conductors 121 and 123 via a shunt 122 and an on-off switch 124. Conductor 123 is connected to electrical ground 125. Control means 127 is provided which must be energized in order for either prime mover 14 or 16 to be operative. Control means 127, for example, may include a control relay RUN having a normally open contact 126 and an electromagnetic coil 128. Electromagnetic coil 128 of relay RUN has one side connected to conductor 121, and the other side connected to microprocessor 94. Microprocessor 94 provides sinking current for relay RUN via a conductor 130 when it is necessary to energize one of the prime movers 14 or 16.

A prime mover selector switch 132 is provided which has an input terminal 134 connected to power supply conductor 121 via the normally open contact 126 of relay RUN. Input terminal 134 is selectively connectable to either one of first and second output terminals 136 and 138. When switch 132 is connected to output terminal 136 engine 18 is selected as the operative prime mover, and the step of energizing relay RUN provides a control voltage for engine starting circuits 140, and for an engine fuel solenoid FS. An input signal 142 from output terminal 138 will be at a logic zero level with relay RUN energized, indicating to microprocessor 94 that engine 18 has been selected by switch 132 as the prime mover, and microprocessor 94 controls the starting circuits 140, as indicated generally by control line 144.

When switch 132 is connected to output terminal 138, the engine starting circuits 140 are disabled and the fuel solenoid FS is de-energized and incapable of being energized. When relay RUN is energized, signal 142 is at the logic one level, indicating to microprocessor 94 that the prime mover selector switch 132 is in the position which selects drive motor 34 as the operative prime mover, and microprocessor 94 accordingly controls contactor 46 to energize and de-energize drive motor 34.

Rotation of compressor 12 is arranged to drive an alternator 146, such as via a pulley-belt arrangement 148 which includes a pulley 150 on a compressor shaft 151, a pulley 152 on an alternator shaft 153, and a linking belt 154. The output of alternator 146 is connected across shunt 122 and battery 120, to provide charging current for battery 120 and voltage for power supply conductors 122 and 124. Conductors 156 and 158, connected across shunt 122, are connected to inputs of microprocessor 94, to provide a voltage having a magnitude and polarity responsive to the magnitude and direction of current flow through shunt 122. Thus, when battery 120 is being charged by alternator 146 the voltage across conductors 156 and 158 will have a first polarity, which will be called positive, and when alternator 146 is not providing an adequate output voltage, resulting in discharge of battery 20, the voltage across conductors 156 and 158 will have a second or negative polarity.

Figure 2:
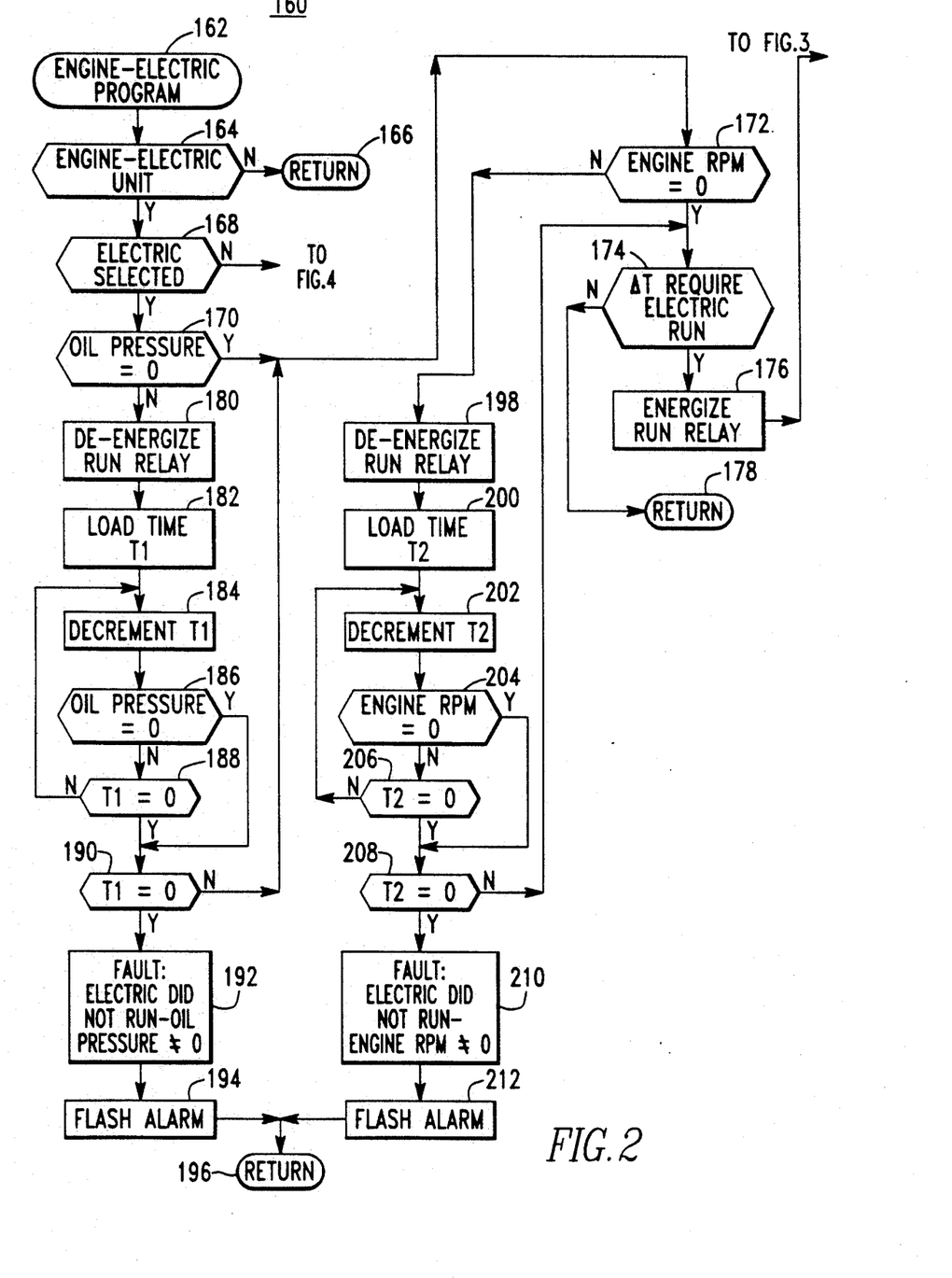
FIG. 2 is a detailed flow chart of a program for implementing a method which interlocks the selection and operation of an internal combustion engine and an electric drive motor, which are arranged to selectively and alternatively function as a prime mover for a refrigerant compressor shown in FIG. 1.

FIG. 2 is a flow chart of a program 160 stored in ROM 96 which implements a first method of the invention related to interlocking the first and second prime movers 14 and 16 such that electric drive motor 34 cannot be energized while engine 18 is rotating, and such that any rotation of engine 18 while motor 34 is energized will result in immediate de-energization of drive motor 34.

More specifically, program 160 is entered at 162 and step 164 determines if refrigeration unit 10 is configured for electric operation, ie., does unit 10 have a stand-by electric motor 34 for operating compressor 12? In the event program 160 is inadvertently included in an "engine only" unit, the program would simply exit at 166. Since refrigeration unit 10 is configured for both engine and electric operation, step 164 proceeds to step 168 which determines if the engine-motor switch 132 is in the "motor select" position. If relay RUN is de-energized, microprocessor 94 can simply energize relay RUN for a short period of time sufficient for it to pick up and then test the logic level of signal 142. If signal 142 is a logic zero, switch 132 is in the "engine select" position, and step 168 proceeds to a program illustrated in FIG. 4, to be hereinafter described, to check for slippage of clutch 20.

When step 168 finds signal 142 is a logic one, indicating operation of compressor 12 with drive motor 34 has been selected, step 170 checks input signal 108 to determine if the oil pressure of engine 18 is zero. It will first be assumed that engine 18 has been shut down and has come to a complete stop, and thus step 170 will find that the engine oil pressure is zero. Step 170 then proceeds to step 172 to check the input signal 102 to determine if the engine speed (RPM) is zero. Upon finding that engine RPM is zero, drive motor 34 may be safely energized, and step 174 determines if the conditioned space 82 requires a cooling cycle or a heating cycle to hold the temperature of conditioned space 82 in a desired temperature band closely adjacent to the selected set point temperature. As hereinbefore stated, the temperature difference $\Delta T$ between the temperature RA of the return air 80 and the set point temperature SP is used to develop a control error signal for use with a control algorithm to determine the proper or required operating condition of refrigeration unit 10 at any instant. When step 174 finds that compressor 12 should be operated, step 176 energizes relay RUN, which must be energized in order to drive compressor 12 with either prime mover 14 or 16, and step 176 also energizes the electromagnetic coils 50 and 60 of contactors 46 and 56 to energize drive motor 34 and evaporator air mover means 64. When step 174 finds conditioned space 82 satisfied, step 174 returns to an executive program at 178.

When step 168 finds electric operation has been selected and step 170 finds that the engine oil pressure is not zero, step 170 proceeds to step 180 which de-energizes relay RUN, to prevent drive motor 34 from being energized, or to de-energize drive motor 34 in the event that it has been previously energized.

Program 160 then enters a phase which provides sufficient time for engine oil pressure to drop to zero, in the event engine 18 is in the process of being shut down. Step 182 clears and loads a predetermined time period T1 into a software timer in RAM, such as five minutes, for example, and program 160, each time it is periodically entered, will loop through steps 184, 186 and 188 until engine oil pressure is found to be zero, or time T1 expires. Step 184 decrements time T1, step 186 checks engine oil pressure, and step 188 determines when time T1 expires. Step 190 determines which of the two events broke the program loop, by determining if time T1 has expired. If step 190 finds that time T1 has expired, the engine oil pressure did not drop to zero during time T1, and step 190 proceeds to step 192 which displays a fault code at an alpha-numeric read-out location 193 on display 100, with the fault code indicating that even though electric operation has been selected, that electric drive motor 34 failed to run because the oil pressure of engine 18 did not drop to zero. Step 194 illuminates and flashes an alarm 195 on display 100, and program 160 is exited at 196.

When step 190 finds time T1 did not expire, it indicates that engine oil pressure has zeroed, and step 190 proceeds to step 172, the same as when step 170 found engine oil pressure to be zero. Step 172 then checks input signal 102 to determine if engine 18 is rotating.

For example, the oil pressure sensor may be faulty, the engine may still be in the process of being shut down with some rotation existing, or someone may be trying to crank engine 18. For whatever cause, if signal 102 indicates any rotation of engine 18, step 198 immediately de-energizes relay RUN to prevent drive motor 34 from being energized, if de-energized, and to de-energize drive motor 34, if energized.

Program 160 then goes into a delay loop similar to that defined by steps 184, 186 and 188, to provide time for engine speed to drop to zero. Step 200 clears and then loads a predetermined time period T2 in a software timer in RAM 98, such as five minutes. Step 202 decrements time T2, step 204 detects engine speed dropping to zero, and step 206 determines when time T2 expires. When this program loop is broken, step 208 determines which of the two events broke the program loop by determining if time T2 had expired. If time T2 did not expire, it indicates that engine speed dropped to zero, and that it is safe to initiate electric operation. Thus, step 208 proceeds to the hereinbefore described steps 174 and 176 to energize drive motor 34, if required by conditioned space 82.

If step 208 finds that time T2 has expired, engine 18 did not stop rotating during timing period T2, and step 210 is entered which displays a fault code at location 193 of display 100, indicating that even though electric operation has been selected that drive motor 34 failed to run because the speed of engine 18 did not drop to zero. Step 212 illuminates and flashes alarm 195, and program 160 exits at 196.

Figure 3:
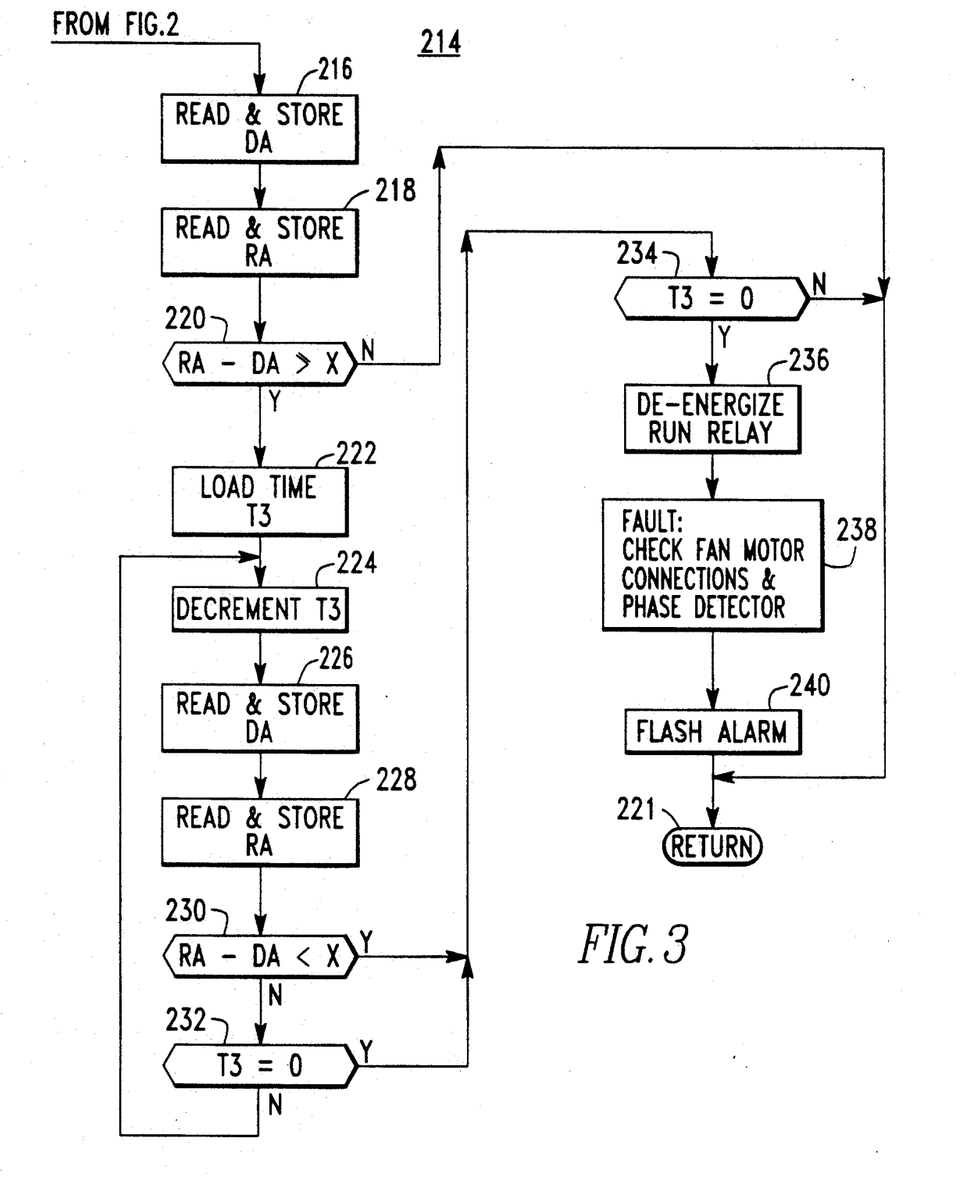
FIG. 3 is a detailed flow chart of a program for implementing a method which detects improper rotational direction of an evaporator fan motor shown in FIG. 1.

When electric operation is initiated in step 176, another aspect of the invention, implemented by a program 214 shown in FIG. 3 and stored in ROM 96, is entered. During engine operation, fan 66 is operated in the correct rotational direction by a pulley and belt arrangement (not shown) off output shaft 22 of engine 18. Program 214 insures that the electrical connections to evaporator fan motor 62 will rotate motor 62 in the proper direction to draw return air 80 into the fan plenum 87, and to discharge conditioned air 90 from the fan plenum 87 back into conditioned space 82. Reversed phase connections will rotate fan motor 62 in the opposite direction, causing a difference value ΔD between the temperature RA of the return air 80 and the temperature DA of the discharge air 90 to increase dramatically, without effective cooling of the conditioned space during a cooling cycle, and without effective heating of conditioned space during a heating cycle. Phase detector PD, when utilized, is supposed to detect improperly connected phase connections to conductors 74, 76 and 78, but the phase detector PD may be faulty or improperly connected, or the connections to motor 62 may be made incorrectly. Program 214 will detect and signal a problem, regardless of the cause, making it unnecessary to even go the expense of using phase detector PD.

More specifically, program 214 is entered at step 216 which reads and stores the temperature DA of the discharge air 90, as provided by input signal 112 from discharge air temperature sensor 116. In like manner, step 218 reads and stores the temperature RA of the return air 80 as provided by input signal 110 from return air temperature sensor 114. Step 220 calculates a temperature difference value ΔD by subtracting one value, such as DA, from the other value, such as RA, to provide an absolute difference value. Step 220 also determines if the absolute difference value ΔD is equal to or exceeds a predetermined reference value X, such as a value of 40 when the readings are in °F., and a value of 22 when the readings are in °C. If step 220 finds the difference value ΔD is less than the reference value X, program 214 exits at 221.

If the difference value ΔD is not less than the reference value X, unit 10 may be in the process of initial temperature pull down, or fan 66 may be being rotated in the wrong direction by motor 62, which will rapidly increase difference value ΔD until it exceeds the reference value X. To determine the cause of a high difference value ΔD detected by step 220, step 220 proceeds to a step 222 which clears and then loads a software timer in RAM 98 with a time value of T3, such as two minutes. Step 224 decrements time T3, and steps 224, 226 and 228 are similar to steps to 216, 218 and 220, continuously providing an updated difference value ΔD to test against the reference value X. A program loop is formed which is broken by step 230 finding that difference value ΔD has dropped below the reference value X, or by time T3 expiring, as detected by step 232. Steps 230 and 232 each proceed to step 234 when either breaks the program loop, and step 234 determines which event occurred by determining if time T3 has expired. If time T3 has not expired, the differential or difference value ΔD has dropped below the reference value X, indicating correct fan rotational direction and program 214 exits at 221.

If step 234 finds that time T3 expired, it indicates that difference value ΔD has remained at or above reference value X, and a serious problem exists, most likely caused by improper rotational direction of fan 66. Step 234 proceeds to step 236 to de-energize relay RUN and de-energize electromagnetic coil 50 of contactor 46 to initiate shutdown of drive motor 34 and fan motor 62. Step 238 displays a fault code at location 193 of display 100 which indicates that the electrical connections to fan motor 62 should be checked, as well as the condition of, and connections to, phase detector PD. Step 240 illuminates and flashes alarm indicator 195 on display 100, and program 214 exits at 221.

Figure 4:
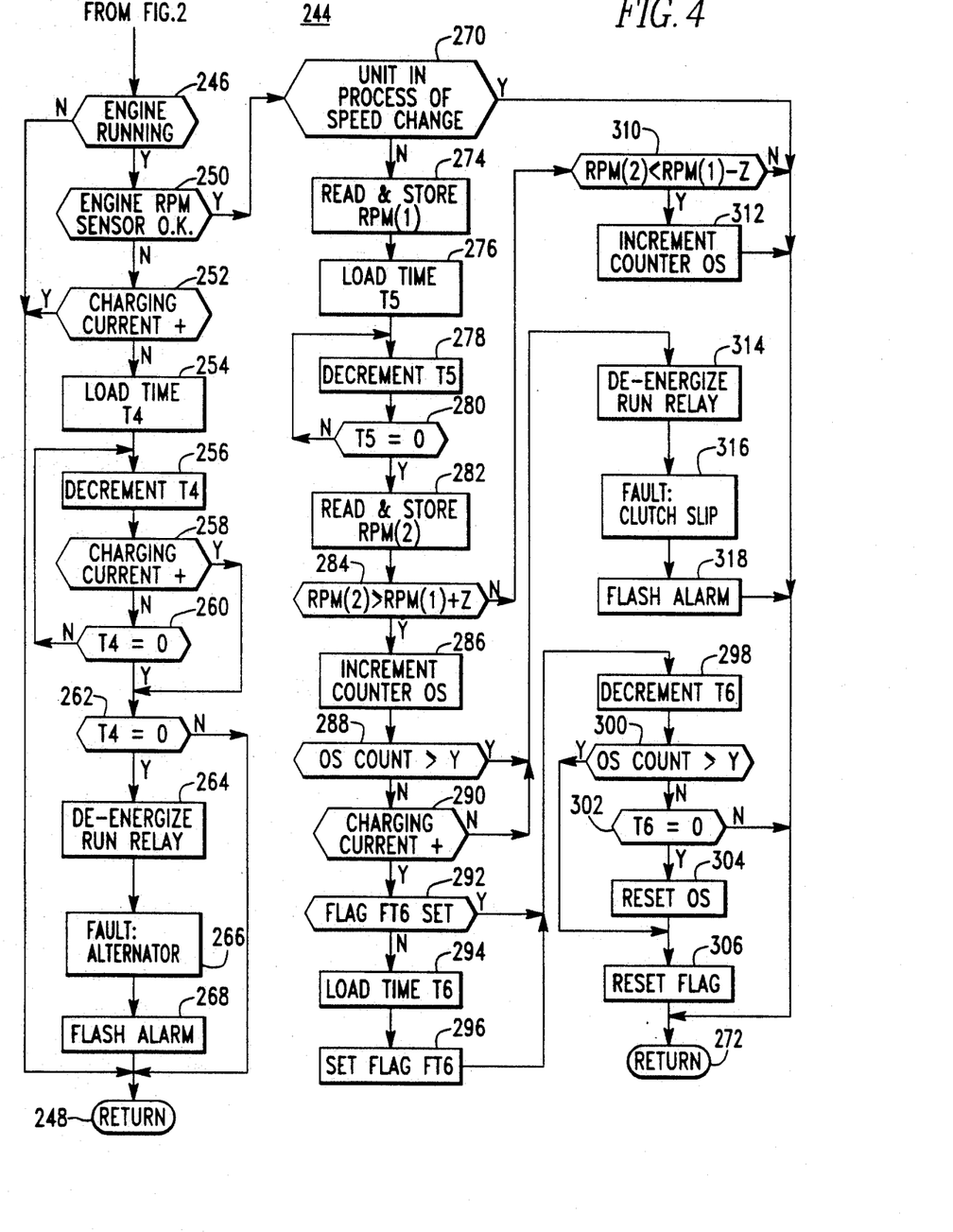
FIG. 4 is a detailed flow chart of a program for implementing a method for detecting slippage of a clutch disposed between the internal combustion engine and the refrigerant compressor.

When step 168 of FIG. 2 finds that electric operation has not been selected by switch 132, it means that engine operation has been selected, and an aspect of the invention implemented by a program 244 shown in FIG. 4, and stored in ROM 96, is entered. This aspect of the invention is related to the detection of slippage of clutch 20. If clutch slippage occurs, it can cause undesirable overheating and damage to clutch 20, as well as damage to other components of refrigeration unit 10 due to heat build up.

More specifically, program 244 is entered at step 246 which determines if engine 18 is running. For example, microprocessor 94 may check either or both of the engine oil pressure and engine speed input signals 102 and 108. Or, an engine starting program such as shown in U.S. Pat. No. 5,140,826, which is assigned to the same assignee as the present application, may set an engine running flag ER, stored in RAM 98, after a successful engine start. If engine 18 is not running, program 244 exits at 248. When step 246 finds engine 18 running, step 250 determines if engine speed sensor 106 is providing a plausible value, as a functional engine speed sensor is essential for a large portion of program 244.

If step 250 finds RPM sensor 106 is not functioning properly, program 244 will still perform some important monitoring functions, including detecting a problem with alternator 146. With a malfunctioning speed sensor 106, step 250 proceeds to step 252 to determine if the battery charging current is positive (+), ie., is the battery 120 being charged by alternator 146? If step 252 finds the charging current positive, as sensed by input conductors 156 and 158, program 244 exits at 248. If step 252 does not find a positive charging current, battery 120 is discharging, providing current for the operation of the circuits and components connected to conductors 121 and 123.

With the detection of a negative charging current in step 252, program 244 enters a phase to determine if the battery discharge condition detected by step 252 is a momentary condition or a chronic condition, with step 254 clearing and then loading a software timer in RAM 98 with a time value T4, such as five seconds, which time value is decremented in a step 256. If the discharging battery current persists for time T4, it indicates a serious problem with alternator 146, with program steps 256, 258 and 260 creating a program loop which is broken by a positive charging current being detected in step 258, or by the expiration of time T4 in step 260, whichever occurs first. Step 262 determines which event broke the program loop, by checking the software timer. If time T4 has not expired, step 262 exits program 244 at 248, as positive charging current was detected by step 258. If step 262 finds time T4 has expired, the discharging condition persisted without interruption for the time period T4, indicating the problem is serious enough to shut refrigeration unit 10 down, with step 264 de-energizing relay RUN, to initiate shutdown of engine 18 by de-energizing fuel solenoid FS. Step 266 displays a fault code at location 193 of display 100 indicating the shutdown was caused by the alternator 146, step 268 illuminates and flashes alarm 195 on display 100, and program 244 exits at 248.

When steps 246 and 250 respectively find engine 18 running and speed sensor 106 functional, step 250 proceeds to step 270. Step 270 determines if unit 10 is in the process of making a normal change in the speed of engine 18. It is common to operate engine 18 at a predetermined speed, such as 2200 RPM, during initial temperature pull down of conditioned space 82, and during severe ambient temperature conditions, and to otherwise operate engine 18 at a lower speed, such as 1400 RPM. If unit 10 is in the process of making such a normal speed change, program 244 exits at 272, to await a stable period of engine operation.

When step 270 finds that refrigeration unit 10 is not in the process of changing the speed of engine 18, step 274 starts a phase of program 244 which detects an engine speed fluctuation in the increasing direction. When clutch 20 slips, the load on engine 18 is suddenly reduced and engine speed increases. Fluctuations in engine speed in the increasing direction are detected by steps 276, 278, 280, 282 and 284, with step 274 reading and storing the present operating speed of engine 18, which is called RPM(1). Step 276 clears and then loads a time value T5, such as two seconds, in a software timer of RAM 98, step 278 decrements time value T5, and step 280 determines when the delay time T5 has expired. As soon as step 280 detects expiration of timing period T5, step 282 reads and stores the engine speed, called RPM(2).

Step 284 then determines if RPM(2) exceeds RPM(1) by a predetermined value Z, such as by 25 RPM. If such an increased speed fluctuation is detected by step 284, step 284 proceeds to step 286 which increments a software counter OS in RAM 98. Step 288 then checks the count value stored in counter OS to determine if it has reached or exceeded a predetermined reference value Y, such as three. If step 288 finds the count value stored in counter OS is less than Y, step 290 determines if the battery charging current is positive. With a slipping clutch, the output of alternator 146 will become erratic, causing periods of negative battery charging current.

If step 290 detects positive battery charging current, a phase of program 244 is entered to determine if the count on counter OS reaches the predetermined count value Y within a predetermined period of time T6, such as 30 seconds. Reaching this count value before the expiration of timing period T6 will result in step 288 proceeding to a shutdown portion of program 244, and expiration of timing period T6 before the count on counter OS reaches Y results in counter OS being reset to zero.

More specifically, upon detecting positive battery charging current, step 290 proceeds to step 292 to determine if timer T6 has already been started, such as by checking the logic level of a flag FT6 in RAM 98. If flag FT6 is not set, it indicates that timer T6 has not been started and step 294 clears and then loads the time value T6 into a software timer in RAM 98, step 296 sets flag FT6, and step 298 decrements timer T6. Step 300 checks the count value of counter OS to determine whether or not it has reached value Y. If count OS has not reached the value Y, step 302 determines if time T6 has expired. If time T6 has not expired, step 302 proceeds to program return 272, to enable count OS to be incremented by other portions of program 244 on the next running thereof. If step 302 finds time T6 expired, step 302 proceeds to step 304 which resets count value OS to zero, as an insufficient number of fluctuations in engine speed were counted during the timing period T6 to warrant shutdown of system 10, enabling counter OS to be restarted from zero upon the next fluctuation in engine speed detected by step 284. Step 304 proceeds to step 306 which resets flag FT6, and program 244 exits at 272.

Should step 300 detect an OS count value of Y or greater, step 300 proceeds to step 306, which resets flag FT6, and the program exits at 272, with the next running of program 244 detecting the count of Y or greater in step 288, which proceeds to a shutdown portion of program 244.

Engine speed fluctuations in a decreasing speed direction may also be counted on counter OS, if desired. For example, when step 284 does not detect an increase in engine speed by the reference value Z, step 284 may proceed to step 310 which determines if RPM(2) is equal to or less than RPM(1) minus the value Z. If the second reading of engine speed is less than the first reading by the value Z, step 310 proceeds to step 312 which increments counter OS. The "no" branch of step 310, and step 312 both proceed to program return 272.

When step 288 detects that counter OS has reached or exceeded value Y, and also when negative charging current is detected by step 290 after a detection of an increase in engine speed of a value Z, or more, refrigeration unit 10 is shut down in step 314, regardless of the count value on counter OS. Step 314 de-energizes relay RUN, de-energizing fuel solenoid FS. Step 316 displays a fault code at read-out 193 of display 100, which identifies that slippage of clutch 20 initiated the shutdown, step 318 illuminates and flashes alarm 195 on display 100, and program 244 exits at 272.

I claim:

1. A method of interlocking the selection and operation of an internal combustion engine and an electric drive motor which are arranged to selectively and alternatively function as a prime mover for a refrigerant compressor in a refrigeration system, to prevent energization of the electric motor while the engine is operative, comprising the steps of:

monitoring engine oil pressure, detecting the selection of the drive motor as the prime mover, determining if the engine oil pressure is zero in response to said detecting step finding selection of the drive motor as the prime mover, preventing energization of the drive motor, when de-energized, and de-energizing the drive motor, when energized, in response to the determining step finding the engine oil pressure is not zero, initiating a predetermined timing period in response to the determining step finding the engine oil pressure is not zero, repeating periodically the step of determining if the engine oil pressure is zero, and providing an indication of a fault when the repeated determining step consistently finds the engine oil pressure is not zero over the predetermined timing period.

2. The method of claim 1 including the step of providing control means which must be energized to operate either the internal combustion engine or the drive motor, and wherein the step of preventing energization of the drive motor, and the step of de-energizing the drive motor, each include the step of de-energizing said control means.

3. The method of claim 1 including the steps of:

determining if the speed of the internal combustion engine is zero in response to a finding that the engine oil pressure is zero, preventing energization of the drive motor, when de-energized, and de-energizing the drive motor, when energized, in response to the determining step finding that the engine speed is not zero, initiating a predetermined timing period in response to the determining step finding that the engine speed is not zero repeating periodically the step of determining if the engine speed is zero, and providing an indication of a fault when the repeated determining step consistently finds the engine speed is not zero over the predetermined timing period.

4. The method of claim 3 including the step of providing control means which must be energized to operate either the internal combustion engine or the drive motor, and wherein the step of preventing energization of the drive motor, and the step of de-energizing the drive motor, each include the step of de-energizing said control means.

5. The method of claim 3 including the step of permitting energization of the drive motor after the determining steps find that: (1) the engine oil pressure is zero, and (2) the engine speed is zero.

6. The method of claim 1 wherein the refrigeration system includes evaporator air mover means driven by an electric fan motor which draws return air from a conditioned space and discharges conditioned air into the conditioned space, including the steps of:

energizing the fan motor, detecting the temperatures RA and DA of the return air and the discharge air DA, respectively, determining the difference between the temperatures RA and DA to provide a first difference value $\Delta D$, comparing said first difference value $\Delta D$ with a first reference value, initiating a predetermined timing period in response to said first difference value $\Delta D$ exceeding said first reference value, repeating, periodically, the steps of detecting the temperatures RA and DA of the return air and the discharge air, and the step of determining the difference between the temperatures RA and DA, to provide updated difference values $\Delta D$, comparing each of said updated difference values—$\Delta D$ with a second reference value, and shutting the prime mover and fan motor down when the step of comparing each updated difference value $\Delta D$ with the second reference value consistently finds that each updated difference value $\Delta D$ exceeds said second reference value over said predetermined timing period.

7. The method of claim 6 wherein the first and second reference values have substantially the same magnitudes.

8. The method of claim 6 including the step of providing a fault indication in response to the step of shutting the prime mover and fan motor down, identifying improper rotational direction of the fan motor as cause of the shutdown.

9. The method of claim 1 including the steps of:

providing a clutch between the internal combustion engine and refrigerant compressor, and detecting slippage of the clutch while the internal combustion engine is the selected prime mover.

10. The method of claim 9 including the steps of providing an alternator driven by rotation of the compressor, and a battery connected to be charged by the alternator, and wherein the step of detecting slippage of the clutch includes the steps of:

detecting a predetermined fluctuation in the speed of the internal combustion engine, when the internal combustion engine is the selected prime mover, monitoring the polarity of the battery current, with a first polarity indicating battery charging current, and a second polarity indicating battery discharging current, and shutting the internal combustion engine down in response to: (1) the detecting step detecting said predetermined fluctuation in engine speed, and (2) the monitoring step detecting the second polarity.

11. The method of claim 10 wherein the step of detecting the predetermined fluctuation in engine speed includes the steps of detecting a predetermined change in the magnitude of the engine speed, in a predetermined direction, over a predetermined period of time.

12. The method of claim 10 including the steps of:

providing a fault indication in response to the step of shutting the internal combustion engine down, and identifying the clutch as the cause of engine shutdown.

13. The method of claim 10 wherein the step of detecting a predetermined fluctuation in the speed of the internal combustion engine includes the steps of:

monitoring engine speed, providing a first speed value, initiating a predetermined timing period after the step of providing the first speed value, providing a second speed value after the expiration of the predetermined timing period, and comparing the second speed value with a sum value obtained by adding a predetermined reference value to the first speed value, with the predetermined fluctuation being indicated when the comparing step finds the second speed value exceeds said sum value.

14. The method of claim 10 wherein the step of detecting a predetermined fluctuation in the speed of the internal combustion engine includes the steps of:

monitoring engine speed, providing a first speed value, initiating a predetermined timing period after the step of providing the first speed value, providing a second speed value after the expiration of the predetermined timing period, and comparing the second speed value with a difference value obtained by subtracting a predetermined reference value from the first speed value, with the predetermined fluctuation being indicated when the comparing step finds the second speed value is less than said difference value.

15. The method of claim 10 including the steps of:

counting the number of predetermined fluctuations in engine speed to provide a count value, when the monitoring step detects the first polarity, initiating a predetermined timing period in response to a count value of one, shutting down the internal combustion engine in response to the count value reaching a predetermined reference value before the expiration of said predetermined timing period, and resetting the count value to zero in response to the expiration of said predetermined timing period before the count value reaches said predetermined reference value.

16. The method of claim 15 wherein the step of detecting the predetermined fluctuation in engine speed includes the steps of detecting a predetermined speed change magnitude, in a first predetermined direction, over a predetermined period of time, to provide a first predetermined fluctuation, and further detecting a predetermined speed change magnitude, in a direction opposite to said first predetermined direction, over a predetermined period of time, to provide a second predetermined fluctuation, and incrementing the count value in response to the detection of either of said first and second predetermined fluctuations.

17. The method of claim 10 wherein the step of detecting a predetermined fluctuation in the speed of the internal combustion engine includes the step of providing an engine speed sensor, and further including the steps of:

detecting when the engine speed sensor is faulty, and shutting the internal combustion engine down after: (1) the detecting step indicates the engine speed sensor is faulty, and (2) the monitoring step detects the second polarity.

18. The method of claim 17 including the step of initiating a predetermined timing period, prior to the step of shutting the internal combustion engine down, in response to the monitoring step detecting the second polarity, and repeating periodically the monitoring step over said predetermined timing period, with the step of shutting the internal combustion engine down being initiated at the expiration of said predetermined timing period when the repeated monitoring step consistently detects the second polarity over said predetermined timing period.

19. The method of claim 17 including the steps of:

providing a fault indication, in response to the step of shutting the internal combustion engine down, and identifying the alternator as the cause of shutdown.

20. A method of detecting slippage of a clutch disposed between an internal combustion engine and a refrigerant compressor in a refrigeration system in which a prime mover for the compressor is selectable between the internal combustion engine and clutch, and an electric drive motor, and wherein the refrigeration system further includes an alternator driven by rotation of the compressor, and a battery connected to be charged by the alternator, comprising the steps of:

detecting a predetermined fluctuation in the speed of the internal combustion engine, when the internal combustion engine is the selected prime mover, monitoring the polarity of the battery current, with a first polarity indicating battery charging current, and a second polarity indicating battery discharging current, and shutting the internal combustion engine down in response to: (1) the detecting step detecting said predetermined fluctuation in engine speed, and (2) the monitoring step detecting the second polarity.

21. The method of claim 20 wherein the step of detecting the predetermined fluctuation in engine speed includes the steps of detecting a predetermined change in the magnitude of the engine speed, in a predetermined direction, over a predetermined period of time.

22. The method of claim 20 including the steps of:

providing a fault indication in response to the step of shutting the internal combustion engine down, and identifying the clutch as the cause of engine shutdown.

23. The method of claim 20 wherein the step of detecting a predetermined fluctuation in the speed of the internal combustion engine includes the steps of:

monitoring engine speed, providing a first speed value, initiating a predetermined timing period after the step of providing the first speed value, providing a second speed value, after the expiration of the predetermined timing period, and comparing the second speed value with a sum value obtained by adding a predetermined reference value to the first speed value, with the predetermined fluctuation being indicated when the comparing step finds the second speed value exceeds said sum value.

24. The method of claim 20 wherein the step of detecting a predetermined fluctuation in the speed of the internal combustion engine includes the steps of:

monitoring engine speed, providing a first speed value, initiating a predetermined timing period after the step of providing the first speed value, providing a second speed value, after the expiration of the predetermined timing period, and comparing the second speed value with a difference value obtained by subtracting a predetermined reference value from the first speed value, with the predetermined fluctuation being indicated when the comparing step finds the second speed value is less than said difference value.

25. The method of claim 20 including the steps of:

counting the number of predetermined fluctuations in engine speed to provide a count value, when the monitoring step detects the first polarity, initiating a predetermined timing period in response to a count value of one, shutting down the internal combustion engine in response to the count value reaching a predetermined reference value before the expiration of said predetermined timing period, and resetting the count value to zero in response to the expiration of said predetermined timing period before the count value reaches said predetermined reference value.

26. The method of claim 25 wherein the step of detecting the predetermined fluctuation in engine speed includes the steps of detecting a predetermined speed change magnitude, in a first predetermined direction, over a predetermined period of time, to provide a first predetermined fluctuation, and further detecting a predetermined speed change magnitude, in a direction opposite to said first predetermined direction, over a predetermined period of time, to provide a second predetermined fluctuation, and incrementing the count value in response to the detection of either of said first and second predetermined fluctuations.

27. The method of claim 20 wherein the step of detecting a predetermined fluctuation in the speed of the internal combustion engine includes the step of providing an engine speed sensor, and further including the steps of:

detecting when the engine speed sensor is faulty, and shutting the internal combustion engine down after: (1) the detecting step indicates the engine speed sensor is faulty, and (2) the monitoring step detects the second polarity.

28. The method of claim 27 including the step of initiating a predetermined timing period, prior to the step of shutting the internal combustion engine down, in response to the monitoring step detecting the second polarity, and repeating periodically the monitoring step over said predetermined timing period, with the step of shutting the internal combustion engine down being initiated at the expiration of said predetermined timing period when the repeated monitoring step consistently detects the second polarity over said predetermined timing period.

29. The method of claim 27 including the steps of:

providing a fault indication, in response to the step of shutting the internal combustion engine down, and identifying the alternator as the cause of shutdown.

30. A method of detecting reverse operation of an evaporator fan motor in a refrigeration system having a refrigerant compressor driven by a prime mover, with the evaporator fan motor driving air mover means which draws return air from a conditioned space and discharges conditioned air into the conditioned space, including the steps of:

detecting the temperatures RA and DA of the return air and the discharge air, respectively, determining the difference between the temperatures RA and DA to provide a first difference value $\Delta D$, comparing said first difference value $\Delta D$ with a first reference value, initiating a predetermined timing period when said first difference value $\Delta D$ exceeds said first reference value, repeating, periodically, the steps of detecting the temperatures RA and DA of the return air and the discharge air, and the step of determining the difference between the temperatures RA and DA, to provide updated difference values $\Delta D$, comparing each of said updated difference values—$\Delta D$ with a second reference value, and shutting the prime mover and fan motor down when the step of comparing each updated difference value $\Delta D$ with the second reference value consistently finds that each updated difference value $\Delta D$ exceeds said second reference value over said predetermined timing period.

31. The method of claim 30 wherein the first and second predetermined reference values have substantially the same magnitudes.

32. The method of claim 30 including the step of providing a fault indication in response to the step of shutting the prime mover and the fan motor down, identifying improper rotational direction of the fan motor as the cause of the shutdown.

* * * * *